United States Patent
Okada et al.

(10) Patent No.: US 11,477,518 B2
(45) Date of Patent: Oct. 18, 2022

(54) SIGNAL PROCESSING DEVICE AND SIGNAL PROCESSING METHOD

(71) Applicant: SONY SEMICONDUCTOR SOLUTIONS CORPORATION, Kanagawa (JP)

(72) Inventors: Satoshi Okada, Kanagawa (JP); Yuichi Hirayama, Chiba (JP); Toshihiro Yamaguchi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 98 days.

(21) Appl. No.: 16/960,437

(22) PCT Filed: Oct. 15, 2018

(86) PCT No.: PCT/JP2018/038289
§ 371 (c)(1),
(2) Date: Jul. 7, 2020

(87) PCT Pub. No.: WO2019/142416
PCT Pub. Date: Jul. 25, 2019

(65) Prior Publication Data
US 2020/0351546 A1 Nov. 5, 2020

(30) Foreign Application Priority Data
Jan. 18, 2018 (JP) .............................. JP2018-006380

(51) Int. Cl.
*H04N 7/16* (2011.01)
*H04N 21/438* (2011.01)
(Continued)

(52) U.S. Cl.
CPC ..... *H04N 21/4382* (2013.01); *H04L 12/5601* (2013.01); *H04L 25/02* (2013.01);
(Continued)

(58) Field of Classification Search
CPC .......... H04N 21/4382; H04N 21/4302; H04N 21/434; H04N 21/44; H04L 12/5601; H04L 25/02; H04L 65/60
See application file for complete search history.

(56) References Cited

U.S. PATENT DOCUMENTS 6,958,827 B1 * 10/2005 Kaneko ................ H04N 1/0402
358/1.2
2003/0095057 A1   5/2003 Gredone et al.
(Continued)

FOREIGN PATENT DOCUMENTS

AR    037576 A1    11/2004
AR    037578 A1    11/2004
(Continued)

OTHER PUBLICATIONS

Tomohiro Saito, "8K Super Hi-Vision Transmission Technology", R&D/No. 152/2015.8, 2015, pp. 56-65.
(Continued)

*Primary Examiner* — Mulugeta Mengesha
(74) *Attorney, Agent, or Firm* — Chip Law Group

(57) ABSTRACT

A signal processing device includes an interface, which includes a demodulation processing unit that executes demodulation processing, a processing unit that executes demux processing or the like, and a sync signal line, a valid signal line, a clock signal line, and a data signal line disposed between the demodulation processing unit and the processing unit, that transmits data signals as two-bit parallel transmission.

19 Claims, 14 Drawing Sheets

(51) Int. Cl.
*H04L 12/54* (2022.01)
*H04L 25/02* (2006.01)
*H04L 65/60* (2022.01)
*H04N 21/43* (2011.01)
*H04N 21/434* (2011.01)
*H04N 21/44* (2011.01)
*H04L 12/70* (2013.01)

(52) U.S. Cl.
CPC ......... *H04L 65/60* (2013.01); *H04N 21/4302* (2013.01); *H04N 21/434* (2013.01); *H04N 21/44* (2013.01); *H04L 2012/5638* (2013.01)

(56) References Cited

U.S. PATENT DOCUMENTS

| | | | |
|---|---|---|---|
| 2003/0105893 A1 | 6/2003 | Gredone et al. | |
| 2003/0105894 A1 | 6/2003 | Gredone et al. | |
| 2003/0105895 A1 | 6/2003 | Gredone et al. | |
| 2003/0105896 A1 | 6/2003 | Gredone et al. | |
| 2008/0209091 A1* | 8/2008 | Nadarajah | H04N 21/4143 710/106 |
| 2008/0268800 A1 | 10/2008 | Gredone et al. | |
| 2009/0046784 A1* | 2/2009 | Tsukamoto | G06F 13/4291 375/247 |
| 2011/0096234 A1* | 4/2011 | Mamidwar | H04N 21/4385 348/501 |
| 2015/0131746 A1* | 5/2015 | Hirayama | H04N 19/66 375/240.28 |
| 2016/0191276 A1* | 6/2016 | Sakai | H04L 25/03057 375/233 |
| 2017/0118317 A1* | 4/2017 | Hasegawa | H04N 21/434 |
| 2018/0006747 A1* | 1/2018 | Yamakage | H04L 29/08756 |
| 2018/0139033 A1 | 5/2018 | Okada et al. | |

FOREIGN PATENT DOCUMENTS

| | | |
|---|---|---|
| AR | 037579 A1 | 11/2004 |
| AR | 0337577 A1 | 11/2004 |
| AR | 037660 A1 | 12/2004 |
| AU | 2002346447 A1 | 6/2003 |
| CA | 2467851 A1 | 6/2003 |
| CA | 2614598 A1 | 6/2003 |
| CN | 2547071 Y | 4/2003 |
| CN | 2547084 Y | 4/2003 |
| CN | 1589532 A | 3/2005 |
| CN | 101079855 A | 11/2007 |
| CN | 101106505 A | 1/2008 |
| CN | 101150546 A | 3/2008 |
| CN | 101399791 A | 4/2009 |
| CN | 101488758 A | 7/2009 |
| DE | 60221042 T2 | 3/2008 |
| DE | 60225487 T2 | 3/2009 |
| EP | 1456957 A1 | 9/2004 |
| EP | 1575173 A1 | 9/2005 |
| EP | 1575174 A1 | 9/2005 |
| ES | 2287339 T3 | 12/2007 |
| JP | 4384912 B2 | 12/2009 |
| JP | 2012-209675 A | 10/2012 |
| JP | 5145261 B2 | 2/2013 |
| JP | 2013-175949 A | 9/2013 |
| JP | 6773032 B2 | 10/2020 |
| KR | 10-2002-88894 Y1 | 9/2002 |
| KR | 10-2002-89028 Y1 | 9/2002 |
| KR | 10-2007-0070140 A | 7/2007 |
| KR | 10-2007-0101189 A | 10/2007 |
| KR | 10-2008-0071613 A | 8/2008 |
| KR | 10-2009-0016705 A | 2/2009 |
| KR | 10-2009-0077833 A | 7/2009 |
| KR | 10-2009-0121367 A | 11/2009 |
| TW | I261758 B | 9/2006 |
| TW | I272499 B | 2/2007 |
| TW | I293415 B | 2/2008 |
| TW | I294576 B | 3/2008 |
| TW | I305988 B | 2/2009 |
| TW | I315145 B | 9/2009 |
| TW | 201002000 A | 1/2010 |
| TW | I323115 B | 4/2010 |
| TW | I330322 B | 9/2010 |
| TW | I332617 B | 11/2010 |
| WO | 03/047114 A1 | 6/2003 |
| WO | 2016/199603 A1 | 12/2016 |
| WO | 2016/199604 A1 | 12/2016 |

OTHER PUBLICATIONS

Hakamada, et al., "8K UHDTV Cable TV Distribution System With a Channel Bonding Technology", NHK R&D, No. 157 2016.5, 2016, pp. 26-35.

International Search Report and Written Opinion of PCT Application No. PCT/JP2018/038289, dated Dec. 18, 2018, 08 pages of ISRWO.

Hakamada, et al., "8K UHDTV Cable TV Distribution System With a Channel Bonding Technology", May 2016, pp. 26-35.

Partial Supplementary European Search Report of EP Application No. 18900634.9 dated Dec. 15, 2020, 13 pages.

ITU-R, "Recommendation ITU-R BO.2098-0—Transmission system for UHDTV satellite broadcasting" ITU-Radiocommunication sector of ITU, International Telecommunication Union, BOS Series Satellite Delivery, Dec. 2016, 34 pages.

Tomohiro Saito, "8K Super Hi-Vision Transmission Technology", NHK Giken, R&D/No. 152/2015.8, 2015, pp. 56-65.

Hakamada, et al., "8K UHDTV Cable TV Distribution System With a Channel Bonding Technology", NHK Giken, R&D/No. 157/2016. 5, 2016, pp. 26-35.

Extended European Search Report of EP Application No. 18900634.9 dated Feb. 4, 2021, 16 pages.

\* cited by examiner

IDEAL WAVEFORM

DEFORMED WAVEFORM

WAVEFORM IN WHICH RINGING OCCURS

SIGNAL PROCESSING DEVICE AND SIGNAL PROCESSING METHOD

CROSS REFERENCE TO RELATED APPLICATIONS

This application is a U.S. National Phase of International Patent Application No. PCT/JP2018/038289 filed on Oct. 15, 2018, which claims priority benefit of Japanese Patent Application No. JP 2018-006380 filed in the Japan Patent Office on Jan. 18, 2018. Each of the above-referenced applications is hereby incorporated herein by reference in its entirety.

TECHNICAL FIELD

The present technology relates to a signal processing device and a signal processing method that can be applied to a reception device that transmits large-capacity high-speed digital data.

BACKGROUND ART

For example, in digital broadcasting, an image (moving image) or the like is encoded by a predetermined encoding method such as Moving Picture Experts Group (MPEG) or the like, and broadcast waves including a Transport Stream (TS) packet in which encoded data obtained as a result of encoding is disposed in a payload are transmitted. A receiver that receives and processes such broadcast waves has been widely used.

The broadcast waves are modulated (for example, as an example, a case of BS digital satellite broadcasting, TC8PSK modulation system and ISDB-S broadcasting system, a case of cable television broadcasting, 64-QAM modulation system and ISDB-C broadcasting system) using carrier waves by a transmitter so as to transmit the TS from the transmitter to each receiver.

Furthermore, there is a method for multiplexing and transmitting a plurality of TSs by using a single carrier wave. A multiplex frame structure of current BS/CS digital broadcasting includes 48 slots per frame, and it is possible to multiplex a plurality of channels by dividing 48 slots.

A multiplex frame structure of a current cable television is referred to as Transport Streams Multiplexing Frame (TSMF), and the TSMF structure includes 53 slots per frame including one header slot and 52 TS arrangement slots. A plurality of channels can be multiplexed by dividing 52 slots.

On the other hand, services that provide a video with higher definition than the current High Definition (HD) broadcasting television such as 4K or 8K broadcasting and music with realistic feeling are about to be launched, and transmission of digital data having larger capacity than the current digital television broadcasting is required for these services.

As a method for transmitting the large-capacity digital data, broadcasting using an Internet Protocol (IP) that is a variable length packet (for example, "Type Length Value" TLV packet in advanced BS broadcasting) has been considered. This advanced BS broadcasting using the TLV packet is referred to as a broadcasting system ISDB-S3, and one frame includes 120 slots. By dividing the 120 slots, three channels can be multiplexed at the maximum in a case of 4K broadcasting, and one channel can be multiplexed at the maximum in a case of 8K broadcasting.

Regarding the advanced BS broadcasting using the TLV packet, a service for directly transmitting broadcast waves from a broadcast satellite to a receiver in each home and a service for retransmitting broadcast waves by using a cable television network have been considered. However, in a case where the broadcast waves are directly received in homes, it is sufficient that the receiver be replaced with a receiver that can receive carrier waves (broadcast wave) modulated to the TLV packet of the advanced BS. However, in a case where the cable television network is used, not only replacement of the receiver in homes but also installation of the cable television network is required.

Therefore, a technology has been proposed that transmits large-capacity digital data by using a currently-used system of the cable television network as reducing cost as much as possible (Patent Documents 1 and 2, and Non-Patent Documents 1 and 2).

This system is a system that receives a carrier wave obtained by modulating the TLV packet of the advanced BS transmitted from the broadcast satellite by a cable television station once and converts the carrier waves into a broadcasting system (ISDB-C) that is a fixed length TS packet according to a cable television transmission path that is the existing facility so as to perform retransmission. A packet obtained by converting the variable length TLV packet into the fixed length TS packet can be referred to as a divided TLV packet so that the packet can be distinguished from a normal fixed length TS packet.

Furthermore, this system divides the large-capacity digital data into the plurality of carrier waves by using the TSMF and performs frequency multiplex transmission, and the frequency division multiplexing is performed by using a combination of 64-QAM or 256-QAM modulation systems of the ISDB-C broadcasting system that is employed for cable television retransmission of current digital broadcasting. At this time, on the reception side, frequency information of the carrier wave and information regarding a synthesis order that is a divided order are acquired from the TSMF as information necessary for synthesis from the signal obtained by demodulating each carrier wave, and the information are synchronized and synthesized to reproduce 4K and 8K broadcast signals.

CITATION LIST

Patent Document

Patent Document 1: Japanese Patent No. 5145261
Patent Document 2: Japanese Patent Application Laid-Open No. 2012-209675

Non-Patent Document

Non-Patent Document 1: NHK Science & Technology Research Laboratories R&D No. 157, May 2016, "8K UHDTV Cable TV Distribution System with a Channel Bonding Technology"
Non-Patent Document 2: NHK Science & Technology Research Laboratories R&D No. 152, August 2015, "8K Super Hi-Vision Transmission Technology"

SUMMARY OF THE INVENTION

Problems to be Solved by the Invention

The technology described is premised on a unit that selects a frequency of a broadcast wave (carrier wave) of large-capacity/high-speed digital data such as 4K or 8K broadcast transmitted by a broadcast satellite by a tuner, executes demodulation processing as a variable length TLV packet, and transmits the data to a processing unit that executes demux (demultiplexing) processing and decoding processing at the subsequent stage. Alternatively, the technology is premised on a unit that converts a variable length TLV packet transmitted by a broadcast satellite into a fixed length TS packet (divided TLV) by a cable television station, divides large-capacity data so as to reduce a transmission capacity, performs frequency multiplexing to the existing ISDB-C broadcasting system using the plurality of carrier waves and retransmits the data, selects a frequency of each carrier wave that has been transmitted by each tuner, executes demodulation processing as a fixed length TS packet (divided TLV) divided from the variable length TLV packet, and transmits the data to a processing unit that executes demux processing and decoding processing at the subsequent stage.

However, the unit that executes the demodulation processing as the variable length TLV packet of the large-capacity/high-speed digital data and the unit that transmits the large-capacity/high-speed digital data obtained by demodulating a plurality of fixed length TS packets (divided TLV) divided from the plurality of variable length TLV packets and returns and synthesizes the demodulated packets to the large-capacity/high-speed digital data from the demodulation processing unit to the processing unit that executes demux processing and decoding processing at the subsequent stage are not specifically disclosed in the documents described above.

For example, in a case where the large-capacity/high-speed digital data is transmitted from the demodulation processing unit to the processing unit that executes the demux processing and the decoding processing at the subsequent stage, frequencies of clocks and data are increased in serial transmission. If a physical distance between the demodulation processing unit and the processing unit is long, effects of a parasitic inductor, a parasitic capacitor capacitance, and a parasitic resistance of a wiring line coupling between the demodulation processing unit and the processing unit deforms an output waveform of the large-capacity/high-speed digital data from the demodulation processing unit, generates a delay, and deforms a waveform. Therefore, the processing unit cannot execute processing. Furthermore, ringing occurs in the output waveform and causes spurious, and the spurious affects surroundings of a tuner circuit or the like that selects a frequency of a carrier wave as a noise (Electromagnetic interference "EMI"). This deteriorates a quality of the signal.

Therefore, an object of the present technology is to provide a signal processing device and a signal processing method that can present deformation of a waveform and prevent occurrence of spurious in a case where large-capacity/high-speed digital data is transmitted from a demodulation processing unit to a processing unit that executes demux processing and decoding processing at the subsequent stage.

Solutions to Problems

The present technology is a signal processing device including a demodulation processing unit that executes demodulation processing, a processing unit that executes demux processing, and a sync signal line, a valid signal line, a clock signal line, and a data signal line disposed between the demodulation processing unit and the processing unit, in which a fixed length packet and a variable length packet are transmitted between the demodulation processing unit and the processing unit by using the sync signal line, the valid signal line, the clock signal line, and the data signal line. Furthermore, the present technology is a signal processing method including including a demodulation processing unit that executes demodulation processing, a processing unit that executes demux processing, and a sync signal line, a valid signal line, a clock signal line, and a data signal line disposed between the demodulation processing unit and the processing unit and transmitting a fixed length packet and a variable length packet between the demodulation processing unit and the processing unit by using the sync signal line, the valid signal line, the clock signal line, and the data signal line.

One to eight data signal lines are wired, and serial transmission or parallel transmission according to the number of wired signal lines can be performed. In a case where the large-capacity/high-speed digital data is transmitted from the demodulation processing unit to the processing unit that executes demux processing and decoding processing at the subsequent stage, a frequency is high, and an effect of a parasitic element of the wiring line is easily received in a case of serial transmission. However, if serial transmission is performed, it is possible to lower a transmission rate of transmission data, and the effect of the parasitic element can be reduced.

Furthermore, in a case where the parallel transmission is performed, it is possible to further lower the transmission rate as increasing the number of parallels. However, more data wiring lines are needed, and the wiring lines occupy an area of the substrate where the demodulation processing unit and the processing unit are mounted, and it is necessary to provide more terminals for the processing unit. Therefore, there is a case where the processing unit cannot cope with the transmission. Therefore, two-bit parallel that is hardly affected by the parasitic element of the wiring lines and can secure an area of the substrate and reduce the number of terminals of the processing unit is optimal.

Furthermore, in a case where the plurality of divided carrier waves on which frequency multiplex transmission has been performed is demodulated and synthesized by the demodulation processing, and for example, in a case where a data and clock signals of three demodulation processing unit are respectively connected to different demodulation processing units, it is necessary for the demodulation processing unit that performs synthesis to include six terminals. However, it is possible to perform input from the three demodulation processing units to a different demodulation processing unit that performs synthesis without increasing the number of terminals by using a plurality of data terminals for parallel output transmission. For example, in a case where eight terminals for parallel output transmission are included, six terminals are used for input, and two terminals are used for two-bit parallel output. It is possible to use all the eight terminals for parallel output.

Effects of the Invention

According to at least one embodiment, since it is possible to lower a transmission rate than that of serial transmission by performing two-bit parallel transmission, an effect of a parasitic element of a wiring line can be reduced. It is possible to reliably transmit large-capacity/high-speed digital data from a demodulation processing unit to a processing unit that executes demux processing and decoding processing at the subsequent stage. In addition, it is possible to secure an area of the substrate and reduce the number of terminals of the processing unit. Note that the effects described herein are not necessarily limited and that the effect may be any effects described in the present technology or an effect different from the above effects. Furthermore, the content of the present technology is not interpreted as limiting the content on the basis of the effects indicated in the following description.

MODE FOR CARRYING OUT THE INVENTION

An embodiment to be described below is a preferable specific example of the present technology, and various technically preferable limitations are applied. However, in the following description, the scope of the present technology is not limited to the embodiment, unless there is a statement to particularly limit the present technology.

Reception System

Figure 1:
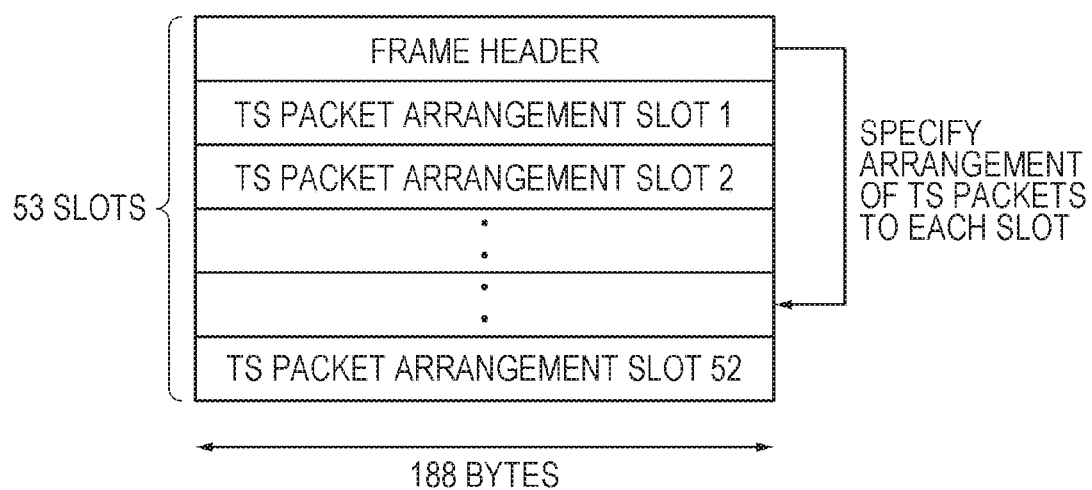
FIG. 1 is a diagram illustrating a TSMF structure which is a multiplex frame structure of a cable television.

FIG. 1 is a diagram illustrating a TSMF structure which is a multiplex frame structure of a cable television. The TSMF structure includes 53 slots per frame, and 53 slots include a single header slot and 52 TS arrangement slots. A plurality of channels can be multiplexed by dividing 52 slots. A TSMF header includes information such as information regarding a position (slot) of each TS in synchronous data (0×47) and a frame structure "fixed length (188 bytes)", a transmission multiplexing signal (Transmission and Multiplexing Configuration and Control: TMCC), or the like.

Figure 2:
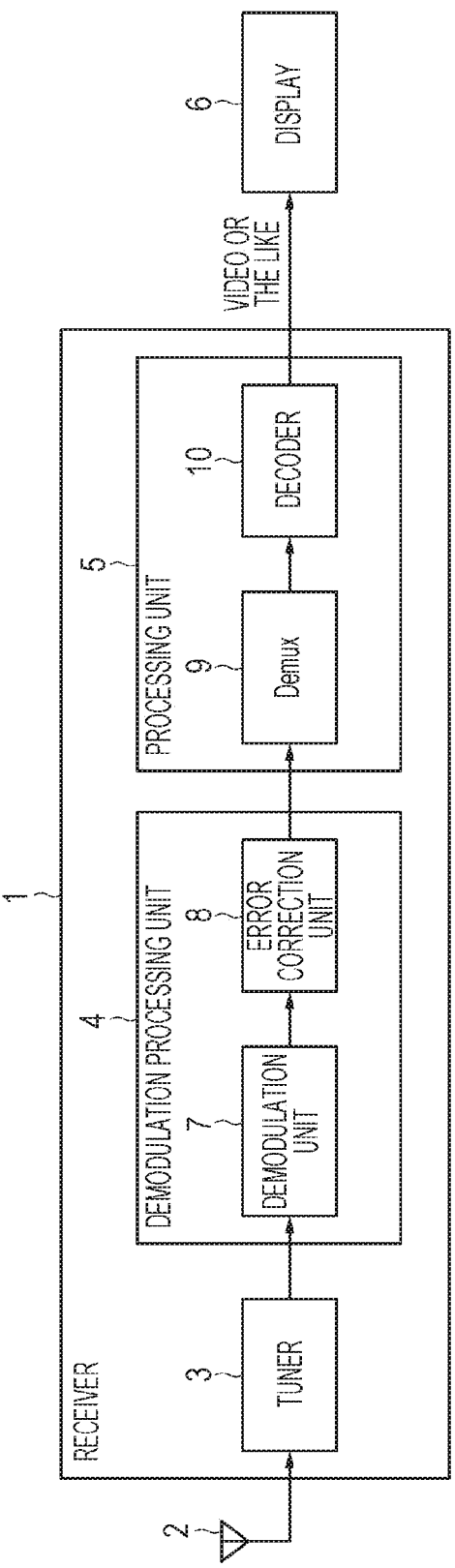
FIG. 2 is a diagram illustrating a configuration of an embodiment of a receiver to which the present technology is applied.

FIG. 2 illustrates an example of a reception system that receives broadcast waves (carrier wave) of large-capacity/high-speed digital data such as 4K or 8K broadcasting transmitted by a broadcast satellite. The reception system includes an antenna 2, a receiver 1, and a display 6. The receiver 1 includes a tuner 3, a demodulation processing unit 4, and a processing unit 5. The demodulation processing unit 4 includes a demodulation unit 7 and an error correction unit 8. The processing unit 5 includes a demultiplexing unit (Demux) 9 and a decoder 10.

The antenna 2 receives, for example, digital broadcast waves of a TLV system transmitted from a transmitter and supplies a reception signal obtained as a result to the receiver 1. The receiver 1 restores and processes the TLV from the reception signal from the antenna 2, extracts a video and sound, and outputs the extracted video and sound to the display 6.

The error correction unit 8 corrects an error in a demodulation signal from the demodulation unit 7 and supplies a signal such as a TLV obtained as a result to the processing unit 5. The processing unit 5 can include, for example, a System-on-a-chip (SOC). The processing unit 5 executes demux processing, for example, processing for dividing moving image content into a video part, a sound part, a subtitle part, or the like.

A sync signal, a valid signal, a data signal, and a clock signal that are output signals output from the demodulation processing unit 4 are supplied to the processing unit 5. The demultiplexing unit 9 of the processing unit 5 separates, for example, video data and sound data included in the data signal, and the decoder decodes the video data into a video signal or decodes the sound data into a sound signal so as to generate video and sound signals and output the signals to the display 6.

Application to Cable Retransmission

Figure 3:
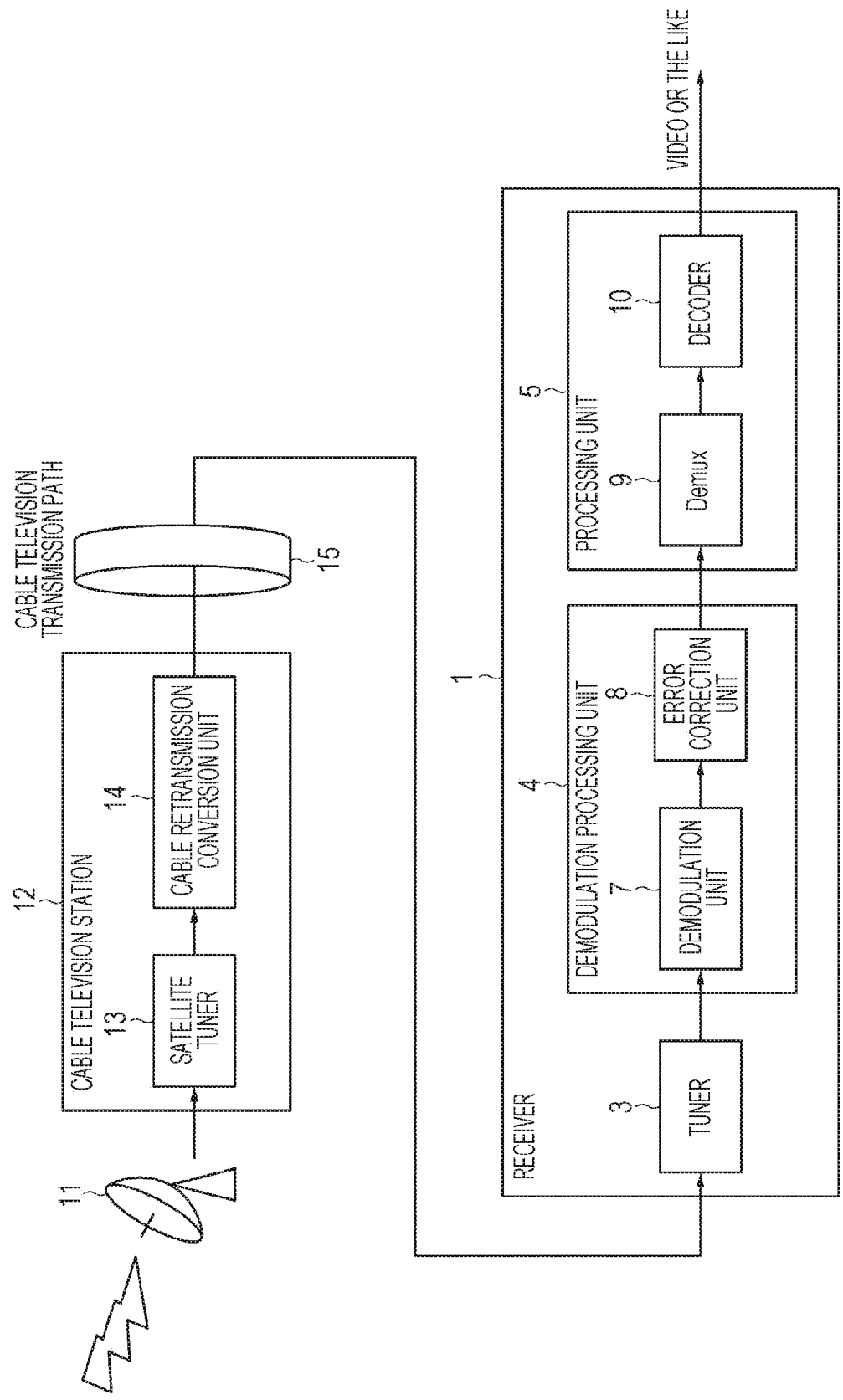
FIG. 3 is a diagram illustrating a configuration of a system regarding digital cable television broadcasting.

FIG. 3 is a diagram illustrating a configuration of a system regarding digital cable television broadcasting. The system includes an antenna 11 that receives satellite broadcasting, a transmitter 12, and a receiver 1. The satellite broadcasting received by the antenna 11 is supplied to the transmitter (cable television station) 12. The transmitter 12 includes a satellite tuner 13 and a cable retransmission conversion unit 14. The transmitter 12 is a device on a side of a broadcast station that performs digital cable television broadcasting. The transmitter 12 converts broadcast waves of the satellite broadcasting received by the antenna 11 into broadcast waves of digital cable television broadcasting and transmits the converted broadcast wave to the side of the receiver through a transmission path 15 of a cable television.

The receiver 1 has a configuration similar to that of the receiver illustrated in FIG. 2. (Therefore, similar reference numeral is applied, and description thereof is omitted). However, the tuner 3 of the receiver 1 illustrated in FIG. 3 receives and processes the digital broadcast waves transmitted through the transmission path 15.

As described above, the satellite broadcasting is broadcasted as digital broadcast waves of the TLV system and received by the antenna 11. The transmitter 12 converts the digital broadcast waves of the TLV system into the broadcast wave of the digital cable television broadcasting, for example, a fixed length TS packet (divided TLV) and transmits the converted packet. This indicates a case where cable retransmission is performed by using an existing ISDB-C standard using the plurality of carrier waves.

Problems in Receiver

Figure 4:
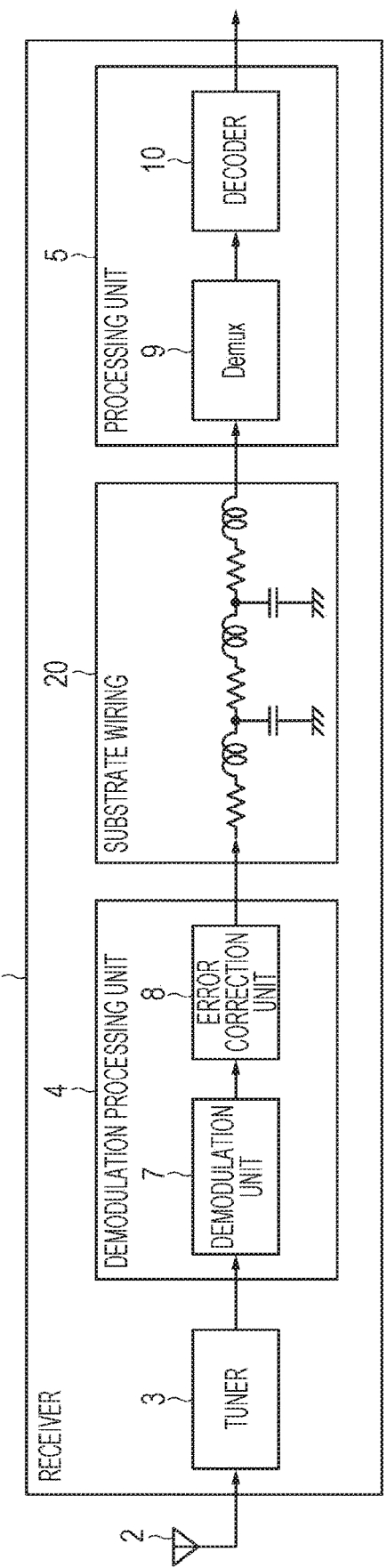
FIG. 4 is a diagram illustrating a configuration of a broadcast system in which an equivalent circuit of a substrate wiring is provided between a demodulation processing unit and a processing unit.

FIG. 4 is a diagram in which an equivalent circuit of a substrate wiring 20 is provided between the demodulation processing unit 4 and the processing unit 5 in a case where the large-capacity/high-speed digital data is transmitted from the demodulation processing unit 4 to the processing unit 5 that executes demux processing and decoding processing at the subsequent stage. Depending on the quality of the material and the substrate of the substrate wiring 20, a parasitic element such as a parasitic resistance (R), a parasitic inductor (L), or a parasitic capacitor capacitance (C) is added to the wiring line. When a signal with a high frequency is transmitted to the substrate wiring 20, an output waveform of the large-capacity/high-speed digital data from the demodulation processing unit 4 is deformed due to an effect of the parasitic elements. Accordingly, a delay occurs, the waveform is deformed, and the processing unit 5 cannot execute processing.

Figure 5A:
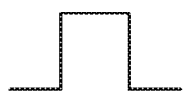
FIGS. 5A, 5B, and 5C are diagrams illustrating examples of waveforms input to the processing unit.
Figure 5B:
Figure 5C:

Furthermore, ringing occurs in the output waveform. The ringing generates spurious, the generated spurious affects around a tuner circuit or the like that selects a frequency of a carrier wave as a noise (EMI), and a quality of a signal is deteriorated. An ideal waveform in FIG. 5A is deformed as illustrated in FIG. 5B, and the ringing occurs in the output waveform as illustrated in FIG. 5C. In this way, the waveform input to the processing unit 5 is deformed by the effect of the parasitic element, and a voltage does not increase to a threshold at which high level/low level of the processing unit 5 is recognized. Furthermore, the ringing occurs in the waveform, and the noise is generated in the waveform.

About Signal Line

Meanwhile, as a conventional receiver, for example, there has been a device that processes a fixed length TS packet. Even in such a device, in order to process a variable length TLV packet and in order to process a variable length TLV packet as a new device, processing described below is executed. Of course, the following processing is equally executed as the processing on the fixed length TS packet.

Figure 6:
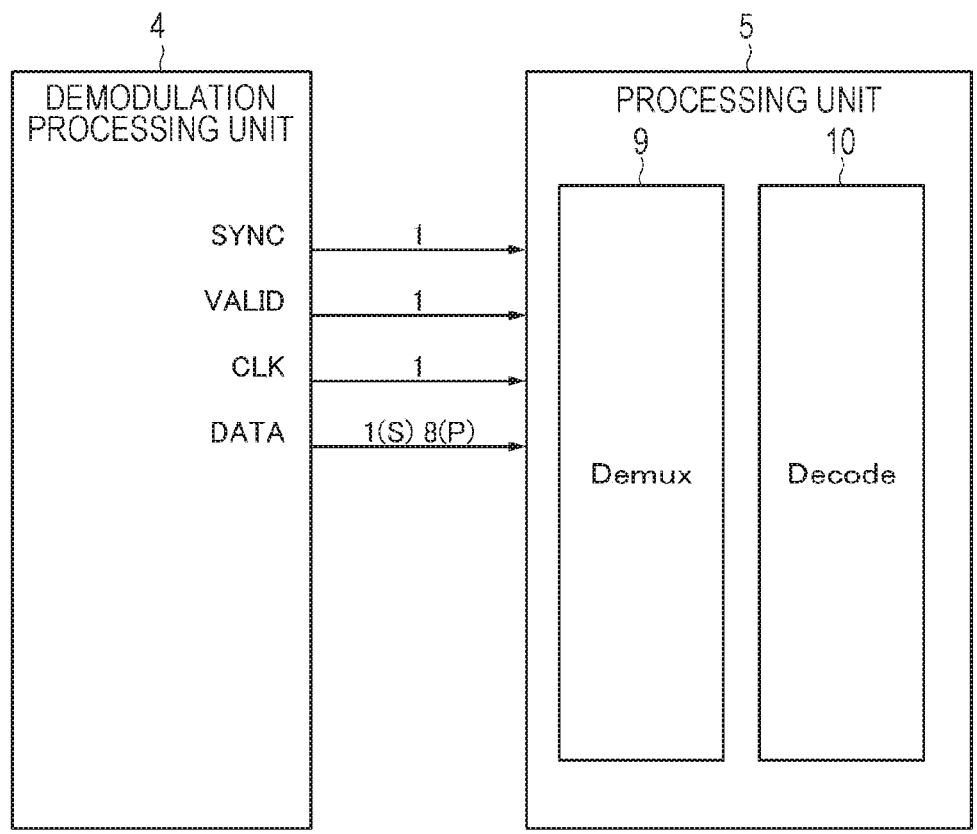
FIG. 6 is a diagram for explaining a signal line provided between the demodulation processing unit and the processing unit.

FIG. 6 is a diagram for explaining signal lines provided between the demodulation processing unit 4 and the processing unit 5. The demodulation processing unit 4 can be an LSI that executes demodulation processing. Furthermore, the processing unit 5 can be an LSI that executes the demux processing. It is necessary for the demodulation processing unit 4 to output data so that the processing unit 5 at the subsequent stage can process the data (condition required by processing unit 5 is satisfied).

According to the present technology, the demodulation processing unit 4 can supply the demodulated data while satisfying the condition required by the processing unit 5. In the following description, a case where the demodulation processing unit 4 and the processing unit 5 are formed as different LSIs will be described as an example.

As illustrated in FIG. 6, four signal lines (a case of serial transmission) are disposed between the demodulation processing unit 4 and the processing unit 5. Of the four signal lines, one is a one-bit signal line that transmits a sync (SYNC) signal, one is a one-bit signal line that transmits a valid (VALID) signal, one is a one-bit signal line that transmits a clock (CLK) signal, and one is a one-bit signal line that transmits a data (DATA) signal. There is a possibility that the data signal lines include one to eight signal lines in correspondence with one bit to eight bits.

For example, in a case of the serial transmission, a single data signal line is included, and eight eight-bit data signal lines are included. In a case of parallel transmission, data is not limited to eight-bit data and may be data having any bits, and signal lines depending on the bit depth are wired. As described later, in the present technology, the sync signal, the valid signal, and the clock signal can be controlled according to the number of data signal lines (bit depth transmitted in one cycle of clock signal).

Figure 7:
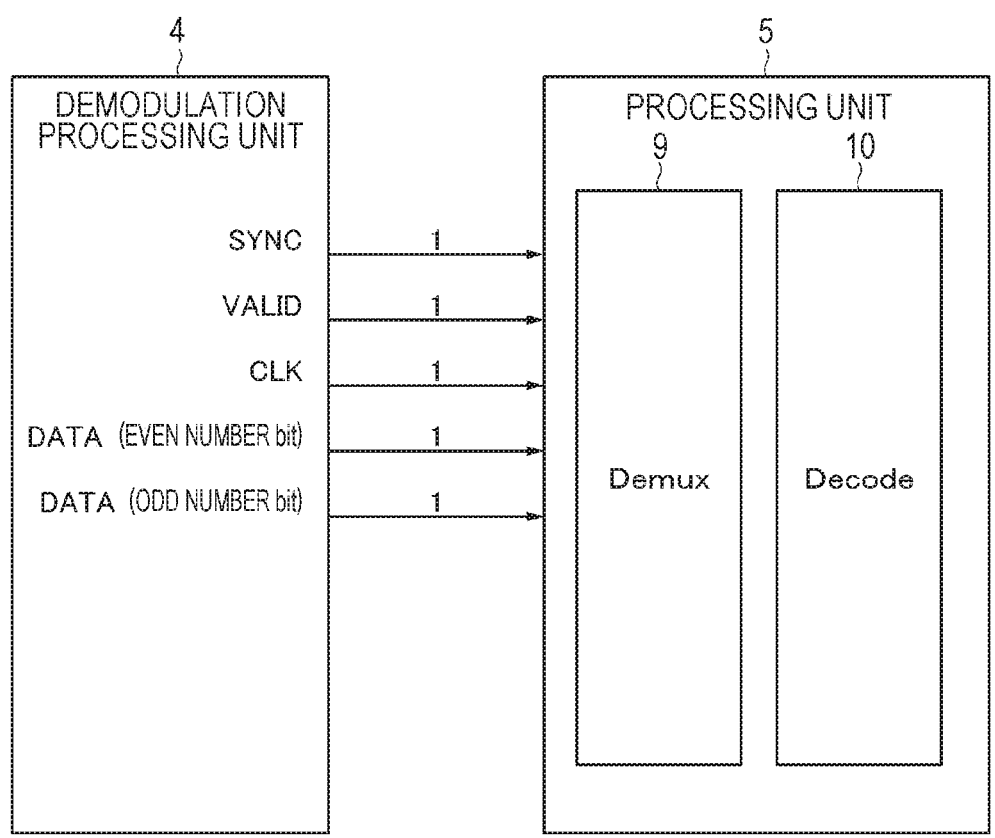
FIG. 7 is a diagram in which an even-numbered bit and an odd-numbered bit are allocated to outputs of data in a case of two-bit parallel transmission.

Furthermore, FIG. 7 is a diagram in which an even-numbered bit and an odd-numbered bit are allocated to outputs of DATA in a case of two-bit parallel transmission. Each bit of data is output from the demodulation processing unit 4 at the rising or falling edge of the clock from a MSB to a LSB in order or from the LSB to the MSB in order, and the processing unit 5 receives (latch) the data at the rising or falling edge of the clock.

The two bits are output by using two bits of eight parallel outputs, and an output terminal of other data may be used. Furthermore, a bit configuration of two bits may have an allocation as illustrated in FIGS. 8A, 8B, 8C, and 8D. FIGS. 8A, 8B, 8C, and 8D are timing charts of data output from each data line in a case of the two-bit parallel transmission.

Figure 9:
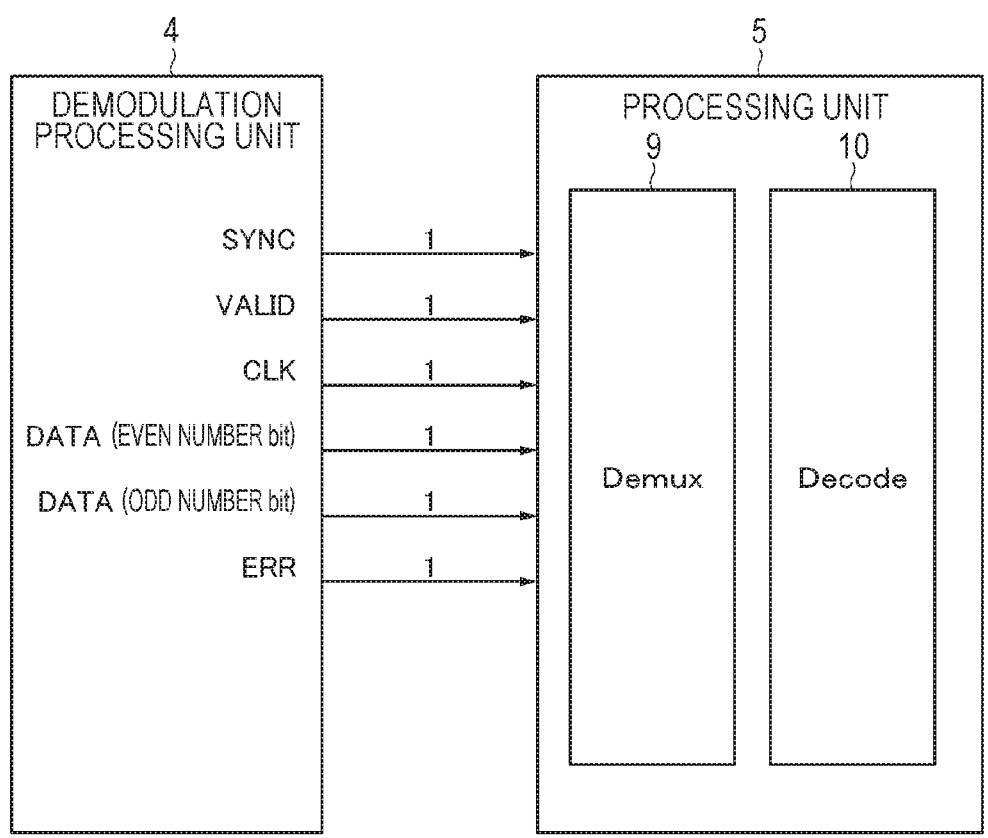
FIG. 9 is a diagram illustrating a configuration that further includes a one-bit signal line for transmitting error information indicating occurrence of an error.

Furthermore, as illustrated in FIG. 9, one-bit signal line that transmits error information indicating occurrence of an error (ERR) may be further included. The signal line illustrated here is an example, and a signal line that transmits other signal may be naturally provided between the demodulation processing unit 4 and the processing unit 5.

Figure 10:
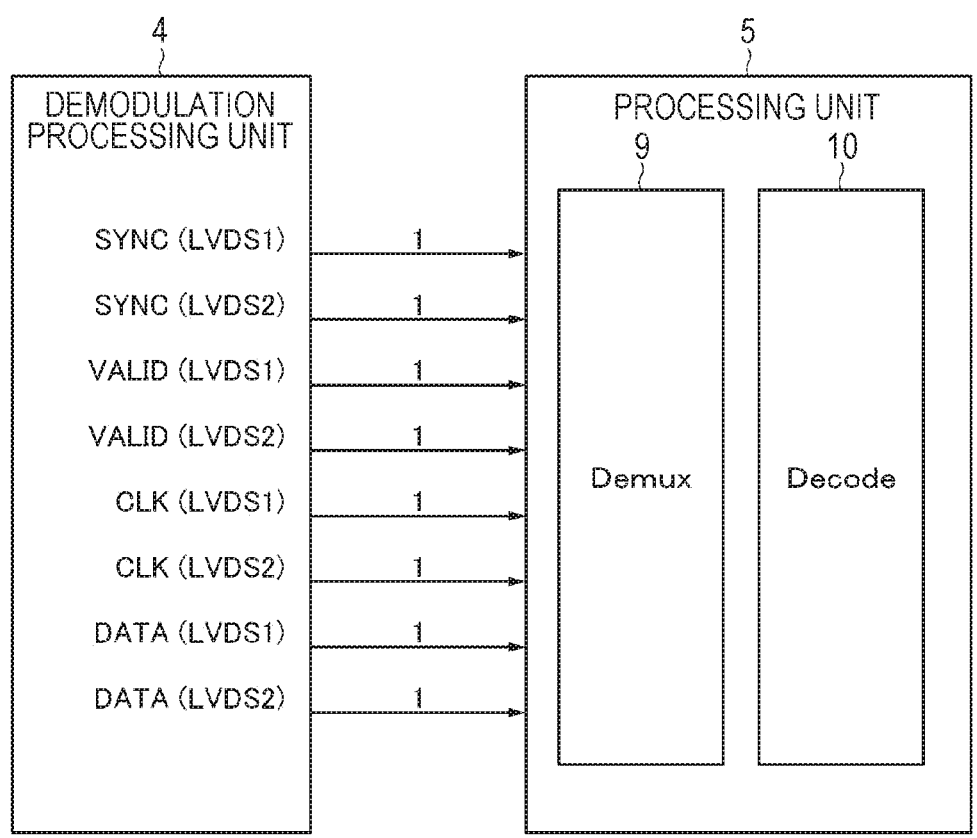
FIG. 10 is a diagram illustrating a configuration using a Low voltage differential signaling (LVDS) signal for an output interface.

Furthermore, in FIG. 10, a Low voltage differential signaling (LVDS) signal is used for an output interface. The LVDS signal can shorten a rising time and is suitable for increasing the speed. Furthermore, since positive and negative signals are simultaneously output, the signals are symmetrical, and there is an advantage that the noise (EMI) hardly occurs.

Table 1 is a diagram for explaining a certain synchronous byte at a head of a head region of each packet.

TABLE 1

| OUTPUT PACKET FORMAT | HEXA-DECIMAL NUMBER | BINARY NUMBER | | | | | | | |
|---|---|---|---|---|---|---|---|---|---|
| | | 7 bit | 6 bit | 5 bit | 4 bit | 3 bit | 2 bit | 1 bit | 0 bit |
| OUTPUT PACKET FORMAT | 7 | F | 0 | 1 | 1 | 1 | 1 | 1 | 1 | 1 |
| FIXED LENGTH TS PACKET (DIVIDED TLV) | 4 | 7 | 0 | 1 | 0 | 0 | 0 | 1 | 1 | 1 |

There are two types of output packet formats, i.e., a variable length TLV packet and a fixed length TS packet (divided TLV).

As allocation of a part of a header of a packet, a synchronous byte is allocated to the head of the header region of the packet to constantly synchronize the plurality of packets.

Expression of this as hexadecimal numbers is "0x7F" in the variable length TLV packet and "0x47" in the fixed length TS packet (divided TLV). Note that (0x) means the hexadecimal number.

Furthermore, expression in binary number is "8'b0111_1111" in the variable length TLV packet and "8'b0100_0111" in the fixed length TS packet (divided TLV). Note that (8') means the binary number of eight bit.

Tables 2 and 3 are tables indicating an example of two-bit data in a case of the two-bit parallel transmission.

TABLE 2

| OUTPUT PACKET FORMAT | EVEN NUMBER bit | | | |
|---|---|---|---|---|
| | MSB 6 bit | — 4 bit | — 2 bit | LSB 0 bit |
| VARIABLE LENGTH TLV PACKET | 1 | 1 | 1 | 1 |
| FIXED LENGTH TS PACKET (DIVIDED TLV) | 1 | 0 | 1 | 1 |
| | ODD NUMBER bit | | | |
| OUTPUT PACKET FORMAT | MSB 7 bit | — 5 bit | — 3 bit | LSB 1 bit |
| VARIABLE LENGTH TLV PACKET | 0 | 1 | 1 | 1 |
| FIXED LENGTH TS PACKET (DIVIDED TLV) | 0 | 0 | 0 | 1 |
| | FROM 4 bit TO 7 bit | | | |
| OUTPUT PACKET FORMAT | MSB 7 bit | — 6 bit | — 5 bit | LSB 4 bit |
| VARIABLE LENGTH TLV PACKET | 0 | 1 | 1 | 1 |
| FIXED LENGTH TS PACKET (DIVIDED TLV) | 0 | 1 | 0 | 0 |
| | FROM 0 bit TO 3 bit | | | |
| OUTPUT PACKET FORMAT | MSB 3 bit | — 2 bit | — 1 bit | LSB 0 bit |
| VARIABLE LENGTH TLV PACKET | 1 | 1 | 1 | 1 |
| FIXED LENGTH TS PACKET (DIVIDED TLV) | 0 | 1 | 1 | 1 |

Data in a case of transmission in FIGS. 8A, 8B, 8C, and 8D will be described.

Figure 8A:
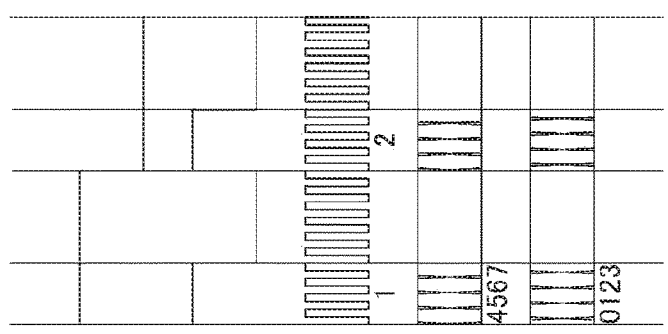
FIGS. 8A, 8B, 8C, and 8D are timing charts of data output from data lines in a case of the two-bit parallel transmission.

FIG. 8A is a case where each of even-numbered bits and each of odd-numbered bits are simultaneously transmitted from a Most Significant Bit (MSB) to a Least Significant Bit (LSB) in order.

In this case, in the variable length TLV packet, since bits are transmitted from a sixth bit that is the MSB of the even-numbered bits, "1" in the sixth bit is transmitted, and "1" in the fourth bit is transmitted next. This operation is repeated until "1" in the zeroth bit is transmitted.

Since bits are transmitted from the seventh bit that is the MSB of the odd-numbered bits, "0" in the seventh bit is transmitted, and "1" in the fifth bit is transmitted next. This operation is repeated until "1" in the first bit is transmitted.

In the fixed length TS packet (divided TLV), since bits are transmitted from the sixth bit that is the MSB of the even-numbered bits, "1" in the sixth bit is transmitted, and "0" in the fourth bit is transmitted next. This operation is repeated until "1" in the zeroth bit is transmitted.

Since bits are transmitted from the seventh bit that is the MSB of the odd-numbered bits, "0" in the seventh bit is transmitted, "0" in the fifth bit is transmitted next. This operation is repeated until "1" in the first bit is transmitted.

Figure 8B:
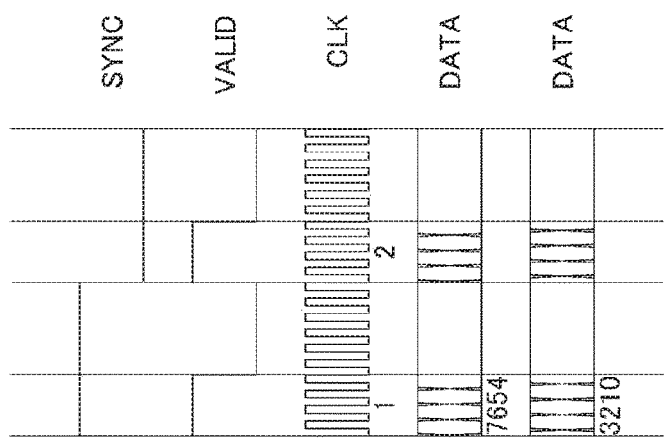

FIG. 8B is a case where the even-numbered bit and the odd-numbered bit are simultaneously transmitted from the LSB to the MSB in order.

This is a case where bits are transmitted in the reverse order of the transmission from the MSB to the LSB and is obvious. Therefore, description thereof is omitted here.

Figure 8C:
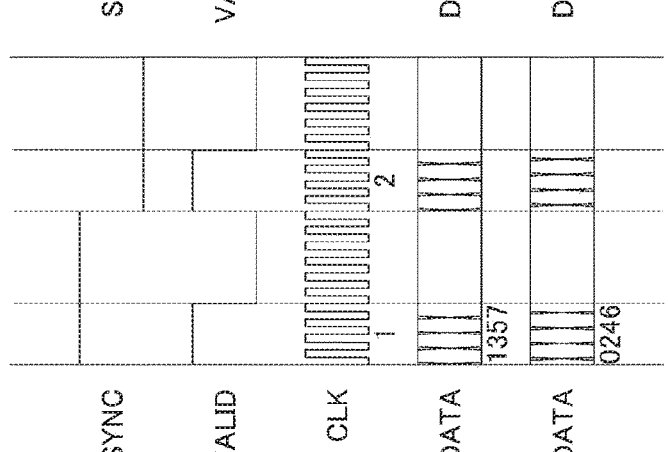

FIG. 8C is a case where the bits from the fourth bit to the seventh bit and from the zeroth bit to the third bit are simultaneously transmitted from the MSB to the LSB in order.

In this case, in the variable length TLV packet, since bits are transmitted from the seventh bit that is the MSB of bits from the fourth bit to the seventh bit, "0" in the seventh bit is transmitted, and "1" in the sixth bit is transmitted next. This operation is repeated until "1" in the fourth bit is transmitted.

Since bits are transmitted from the third bit that is the MSB of bits from the zeroth bit to the third bit, "1" in the third bit is transmitted, and "1" in the second bit is transmitted next. This operation is repeated until "1" in the zeroth bit is transmitted.

In the fixed length TS packet (divided TLV), since bits are transmitted from the seventh bit that is the MSB from the fourth bit to the seventh bit, "0" in the seventh bit is transmitted, and "1" in the sixth bit is transmitted next. This operation is repeated until "0" in the fourth bit is transmitted.

Since bits are transmitted from the third bit that is the MSB of bits from the zeroth bit to the third bit, "0" in the third bit is transmitted, and "1" in the second bit is transmitted next. This operation is repeated until "1" in the zeroth bit is transmitted.

Figure 8D:
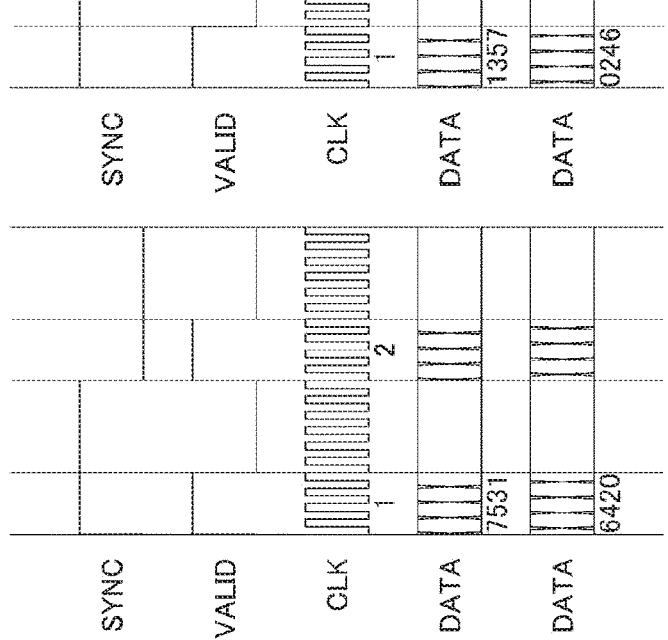

FIG. 8D is a case where the bits from the fourth bit to the seventh bit and from the zeroth bit to the third bit are simultaneously transmitted from the LSB to the MSB in order. This is a case where bits are transmitted in the reverse order of the transmission from the MSB to the LSB and is obvious. Therefore, description thereof is omitted here.

About Plurality of Carrier Waves

Figure 11:
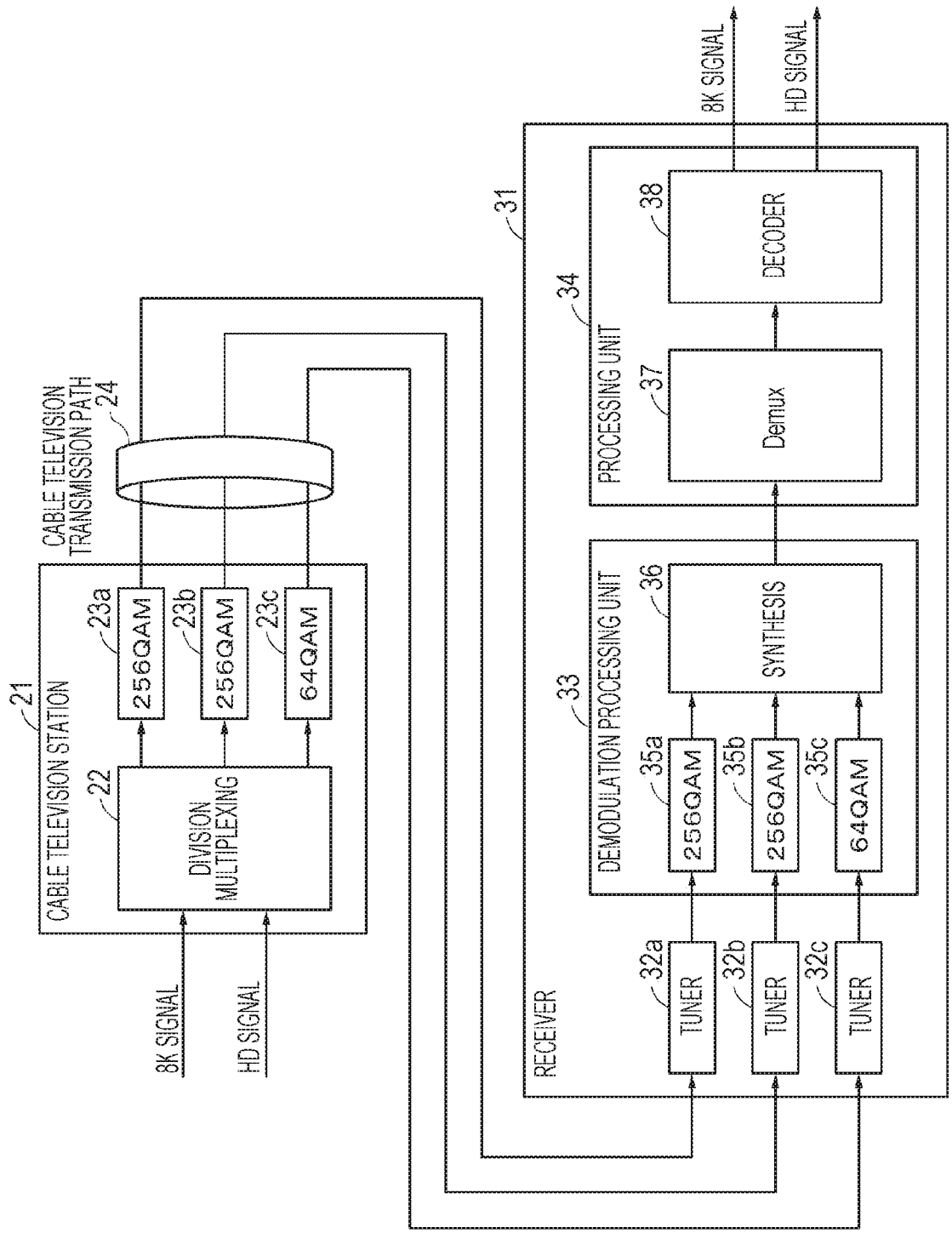
FIG. 11 is a diagram illustrating an example indicating a system for dividing large-capacity digital data into a plurality of carrier waves by using the TSMF and performing frequency multiplex transmission.

FIG. 11 is a diagram illustrating an example of a system for dividing the large-capacity digital data into the plurality of carrier waves by using the TSMF and performing frequency multiplex transmission, and a cable television station 21, a cable television transmission path 24, and a receiver 31 are included. Variable length TLV packet data (8K signal) and fixed length packet TS data (HD signal) are supplied to the cable television station 21, and the supplied data is multiplexed by a division multiplexing circuit 22.

Since an 8K signal at about 100 MHz cannot be transmitted by one channel (6 MHz) of the cable television, the signal is divided into three channels and is transmitted. The variable length TLV packet data is converted into the fixed length TS packet (divided TLV) and frequency-division multiplexed by a combination of 64-QAM or 256-QAM modulation systems of the ISDB-C broadcasting system, and then is transmitted to the receiver through the cable television transmission path. Therefore, the cable television station 21 includes a 256-QAM modulation circuit 23a, a 256-QAM modulation circuit 23b, and a 64-QAM modulation circuit 23c.

Figure 12:
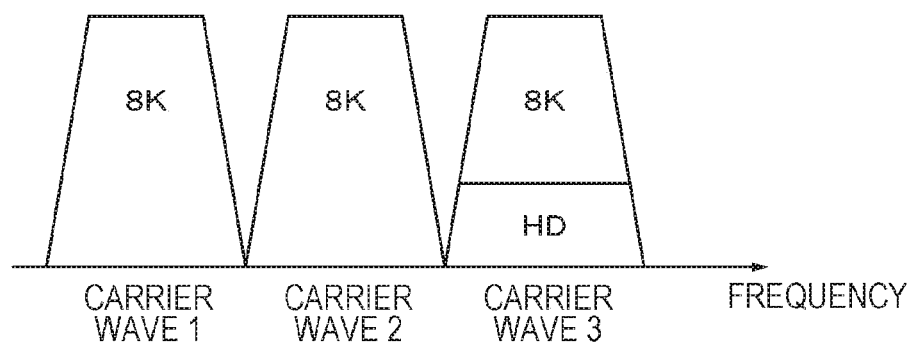
FIG. 12 is a diagram illustrating positions of three carrier waves with respect to the frequency.

In the receiver 31, a plurality of tuners 32a, 32b, and 32c selects an RF signal that is each carrier wave on which frequency division has been performed as illustrated in FIG. 12 and converts the frequency of the RF signal into an IF signal. FIG. 12 illustrates positions of three carrier waves with respect to the frequency and illustrates a case where 8K broadcasting (one broadcast) and HD broadcasting (one broadcast) are frequency-multiplexed.

A demodulation processing unit 33 includes 256-QAM demodulation circuits 35a and 35b and a 64-QAM demodulation circuit 35c, a demodulation output of each demodulation circuit is synthesized by a synthesis circuit 36. The demodulation processing unit 33 demodulates the carrier waves of the 64-QAM and 256-QAM modulation systems of the ISDB-C broadcasting system and synthesizes the demodulated signals. The 8K signal or the HD signal that is the division-multiplexed signal is extracted and is transmitted to a processing unit 34 that executes demux processing by a demultiplexing unit 37 and decoding processing by a decoder 38 at the subsequent stage.

Figure 13:
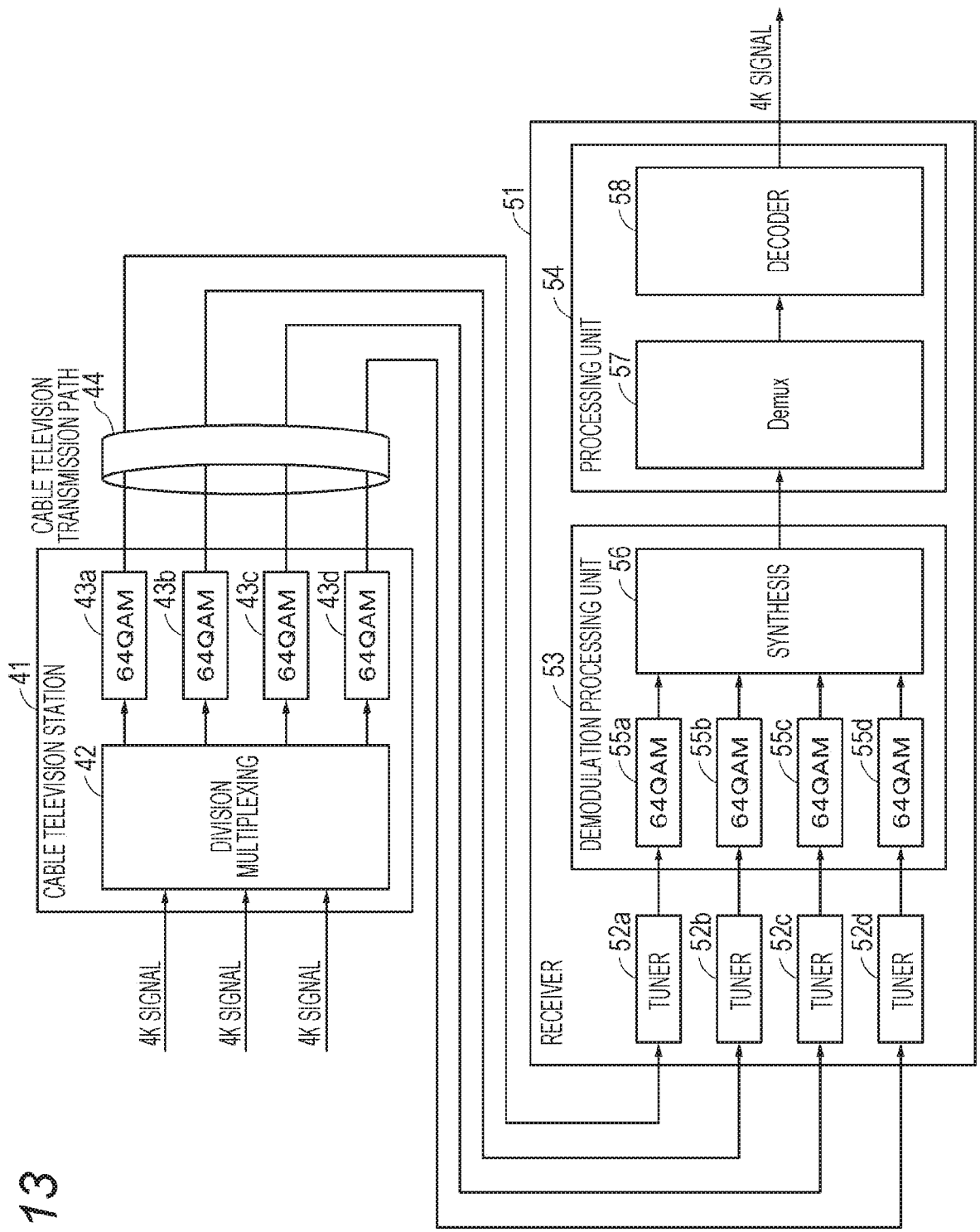
FIG. 13 is a diagram illustrating an example of a system, which is another form of FIG. 11, for performing frequency multiplex transmission by using four carrier waves.

FIG. 13 is a diagram illustrating an example of a system, which is another form of FIG. 11, for performing frequency multiplex transmission by using four carrier waves. Variable length TLV packet data (4K signal) is supplied to a division multiplexing circuit 42 of a cable television station 41, and the variable length TLV packet data is converted into a fixed length TS packet (divided TLV). Outputs of the division multiplexing circuit 42 are supplied to 64-QAM modulation circuits 43a, 43b, 43c, and 43d and frequency-division multiplexed by a combination of 64-QAM modulation systems of the ISDB-C broadcasting system. Then, the outputs are transmitted to a receiver 51 through a cable television transmission path 44.

Figure 14:
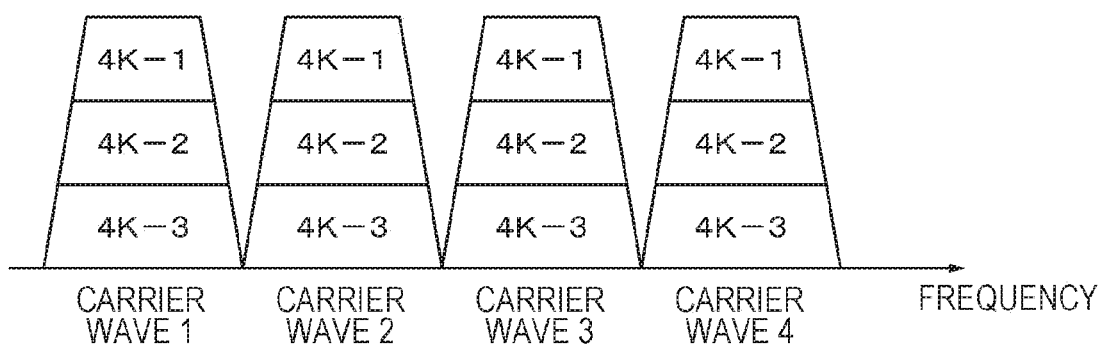
FIG. 14 is a diagram illustrating positions of four carrier waves with respect to the frequency.

In the receiver 51, a plurality of tuners 52a, 52b, 52c, and 52d selects an RF signal that is each carrier wave on which frequency division has been performed as illustrated in FIG. 14 and converts the frequency of the RF signal into an IF signal. Outputs of the tuners 52a to 52d are respectively supplied to 64-QAM demodulation circuits 55a, 55b, 55c, and 55d. Demodulation outputs of the demodulation circuits 55a to 55d are supplied to a synthesis circuit 56.

FIG. 14 illustrates a case where three times of broadcast of 4K broadcasting are frequency-multiplexed. The carrier waves of the 64-QAM modulation system of the ISDB-C broadcasting system is demodulated by the 64-QAM demodulation circuits 55a, 55b, 55c, and 55d of the demodulation processing unit 53, and the synthesis circuit 56 synthesizes the demodulated signals. A division-multiplexed 4K signal is extracted and supplied to the processing unit 51 that executes demux processing by a demultiplexing unit 57 and decoding processing by a decoder 58 at the subsequent stage.

Case where Plurality of Carrier Waves is Received by Present Technology

Figure 15:
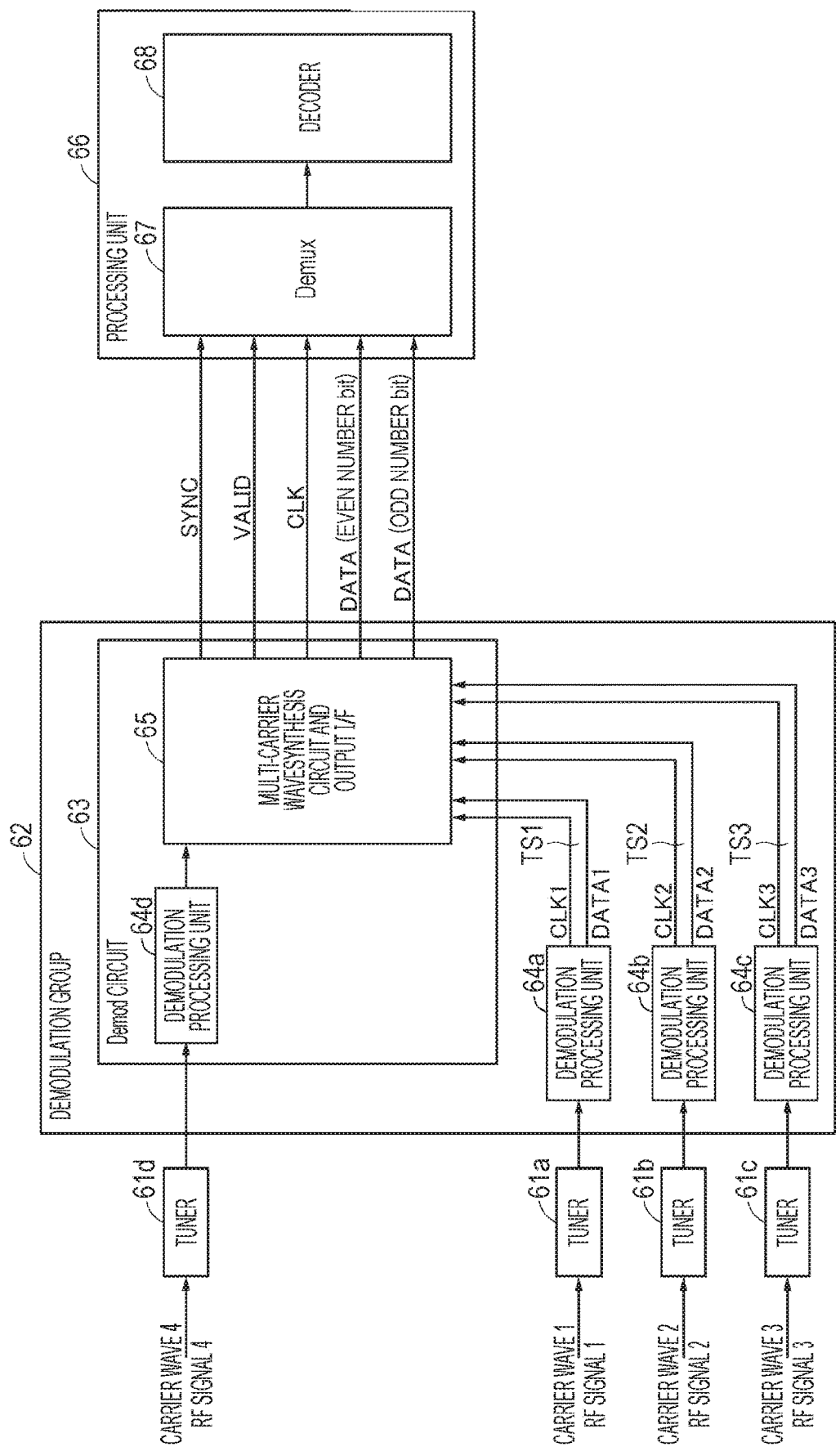
FIG. 15 is a schematic system diagram of a receiver that receives four multiple carrier waves by using a frequency multiplex transmission system according to the present technology.

FIG. 15 is a schematic diagram of a system in which the present technology is applied to a receiver that receives four multiple carrier waves by using the frequency multiplex transmission system as illustrated in FIG. 14. In the receiver, four tuners 61a, 61b, 61c, and 61d select RFs that are frequency-divided carrier waves and supply the RFs to a demodulation group 62.

The demodulation group 62 includes a demodulation circuit 63 including a demodulation processing unit 64d, a demodulation processing unit 64a, a demodulation processing unit 64b, and a demodulation processing unit 64c. The demodulation circuit 63 further includes a multi-carrier wave synthesis circuit and an output interface (I/F) 65. The demodulation group 62 demodulates the carrier waves of the modulation system of the ISDB-C broadcasting system, synthesizes the demodulated signals, extracts a signal that is a division-multiplexed signal, and transmits the signal to a processing unit 66 that executes demux processing and decoding processing at the subsequent stage. The processing unit 66 includes a demultiplexing unit 67 and a decoder 68.

An IF signal output from the tuner 61d is input to an A/D converter (ADC) of the demodulation processing unit 64d of the demodulation circuit 63, and is input to the multi-carrier wave synthesis circuit 65 after being demodulated. Furthermore, a plurality of TS signals TS1, TS2, and TS3 before multi-carrier wave synthesis respectively output from the demodulation processing units 64a, 64b, and 64c is input to the multi-carrier wave synthesis circuit and the output I/F 65 of the demodulation circuit 63. A fixed length packet (TS), a variable length packet (TLV), or a single TS is output from the multi-carrier wave synthesis circuit and the output I/F 65.

An output interface of the multi-carrier wave synthesis circuit and the output I/F 65 includes a SYNC, a VALID, a CLK, and two-bit DATA terminals. This is an example where an even-numbered bit and an odd-numbered bit are allocated to the outputs of data in a case of the two-bit parallel transmission. In a case where up to eight bits can be output in parallel by the DATA terminal and eight terminals are prepared, all the terminals can be used for inputs from the demodulation processing units 64a, 64b, and 64c and two-bit parallel output. Furthermore, an output interface format may be one-bit serial output instead of the two-bit parallel output. Furthermore, the allocation of the outputs of DATA in a case of the two-bit parallel transmission is not limited to the even-numbered bit and the odd-numbered bit.

Modification

One embodiment of the present technology has been specifically described above. However, the present technology is not limited to the above-mentioned embodiment, and various kinds of modifications based on technical ideas of the present technology are possible. Furthermore, the configuration, method, process, shape, material, value, and the like described in the embodiment are merely exemplary, and different configurations, methods, processes, shapes, materials, values, and the like may be used as necessary.

Note that, the present technology can have the following configuration.

(1)
A signal processing device including:
a demodulation processing unit configured to execute demodulation processing;
a processing unit configured to execute demux processing; and
a sync signal line, a valid signal line, a clock signal line, and a data signal line disposed between the demodulation processing unit and the processing unit, in which
a fixed length packet and a variable length packet are transmitted between the demodulation processing unit and the processing unit by using the sync signal line, the valid signal line, the clock signal line, and the data signal line.

(2)
The signal processing device according to (1), in which the variable length packet includes a TLV packet.

(3)
The signal processing device according to (1), in which the variable length packet includes a TLV packet, and error information indicating whether or not an error occurs in a packet is included in a packet header region of the TLV packet.

(4)
The signal processing device according to (1), in which the variable length packet includes a TLV packet, and packet error information is included in a region in which information regarding a packet type included in the TLV packet is written.

(5)
The signal processing device according to (3), further including:
an error signal line that transmits the error information.

(6)
The signal processing device according to (3), in which the error information is transmitted in error correction code units or variable length packet units.

(7)
The signal processing device according to (1), in which the one to eight data signal lines are wired, and serial transmission or parallel transmission according to the number of wired data signal lines is performed.

(8)
The signal processing device according to (1), in which the data signal line has an arbitrary bit width of one to eight bits.

(9)
The signal processing device according to (1), in which the data signal line transmits data for each eight-bit bit sequence in order starting from a synchronous byte in a header part that is a head of a packet including a TLV stream of the variable length TLV packet or a TS stream of a fixed length TS packet or a fixed length TS packet (divided TLV) converted from the variable length TLV packet.

(10)
The signal processing device according (9), in which in a case where the data transmitted for each eight-bit bit sequence from the synchronous byte is transmitted by two-bit parallel transmission, outputs of seven bits, five bits, three bits, one bit, six bits, four bits, two bits, and zero bit are allocated to the data signal lines in an output order.

(11)
The signal processing device according (9), in which in a case where the data transmitted for each eight-bit bit sequence from the synchronous byte is transmitted by two-bit parallel transmission, outputs of one bit, three bits, five bits, seven bits, zero bit, two bits, four bits, and six bits are allocated to the data signal lines in an output order.

(12)
The signal processing device according (9), in which in a case where the data transmitted for each eight-bit bit sequence from the synchronous byte is transmitted by two-bit parallel transmission, outputs of three bits, two bits, one bit, zero bit, seven bits, six bits, five bits, and four bits are allocated to the data signal lines in an output order.

(13)
The signal processing device according (9), in which in a case where the data transmitted for each eight-bit bit sequence from the synchronous byte is transmitted by two-bit parallel transmission, outputs of zero bit, one bit, two bits, three bits, four bits, five bits, six bits, and seven bits are allocated to the data signal lines in an output order.

(14)
The signal processing device according to any one of (1) to (6), in which
the sync signal line, the valid signal line, the clock signal line, and the data signal line use Low voltage differential signaling (LVDS) for an output interface.

(15)
The signal processing device according to any one of (10) to (14), in which
in a case where two-bit parallel transmission is performed, two of a plurality of data outputs are allocated as output terminals.

(16)
The signal processing device according to any one of (10) to (14), in which
in a case where two-bit parallel transmission is performed, two of eight data outputs are allocated as output terminals.

(17)
The signal processing device according to (15) or (16), in which
in a system that receives a plurality of carrier waves, a plurality of data outputs, other than outputs used for two-bit parallel output, among the plurality of data outputs is allocated to an input to a synthesis unit that synthesizes the plurality of carrier waves.

(18)
The signal processing device according to (15) or (16), in which
in a system that receives a plurality of carrier waves, six data outputs, other than data outputs used for two-bit parallel output, of eight data outputs are allocated to an input to a synthesis unit that synthesizes the plurality of carrier waves.

(19)
The signal processing device according to (15) or (16), in which
in a system that receives a plurality of carrier waves, six data outputs, other than data outputs used for one-bit serial output, of eight data outputs are allocated to an input to a synthesis unit that synthesizes the plurality of carrier waves.

(20)
A signal processing method including:
including a demodulation processing unit that executes demodulation processing, a processing unit that executes demux processing, and
a sync signal line, a valid signal line, a clock signal line, and a data signal line disposed between the demodulation processing unit and the processing unit; and
transmitting a fixed length packet and a variable length packet between the demodulation processing unit and the processing unit by using the sync signal line, the valid signal line, the clock signal line, and the data signal line.

REFERENCE SIGNS LIST

61*a*, 61*b*, 61*c*, 61*d* Tuner
62 Demodulation group
63 Demodulation circuit
64*a*, 64*b*, 64*c*, 64*d* Demodulation processing unit
65 Multi-carrier wave synthesis circuit and output I/F
66 Processing unit
67 Demultiplexing unit
68 Decoder

The invention claimed is:
1. A signal processing device comprising:
a demodulation processing unit configured to execute demodulation processing;
a demultiplex processing unit configured to execute demux processing; and
a sync signal line, a valid signal line, a clock signal line, and a data signal line disposed between the demodulation processing unit and the demultiplex processing unit, wherein a fixed length packet and a variable length packet are transmitted between the demodulation processing unit and the demultiplex processing unit using the sync signal line, the valid signal line, the clock signal line, and the data signal line based on a synchronous byte allocated in a header of the fixed length packet and the variable length packet, and wherein the variable length packet includes a Type Length Value (TLV) packet and the fixed length packet includes a Transport Stream (TS) packet of fixed length or a packet obtained by conversion of the variable length packet into a fixed length TS packet.

2. The signal processing device according to claim 1, wherein
error information indicates whether or not an error occurs in the variable length packet, and wherein the error information is included in the header of the variable length packet.

3. The signal processing device according to claim 1, wherein
error information is included in a region in which information regarding a packet type of the variable length packet is written.

4. The signal processing device according to claim 2, further comprising:
an error signal line that transmits the error information.

5. The signal processing device according to claim 2, wherein
the error information, included in the header of the variable length packet, is transmitted in error correction code units or variable length packet units.

6. The signal processing device according to claim 1, wherein the data signal line includes one to eight data signal lines, wherein the one to eight data signal lines are wired, and wherein serial transmission or parallel transmission, according to a number of wired data signal lines, is performed.

7. The signal processing device according to claim 1, wherein the data signal line has an arbitrary bit width of one to eight bits.

8. The signal processing device according to claim 1, wherein
the data signal line transmits data for an eight-bit bit sequence in order starting from the synchronous byte in the header of the fixed length packet and the variable length packet.

9. The signal processing device according to claim 8, wherein
in a case where the data transmitted for the eight-bit bit sequence, from the synchronous byte, is transmitted by two-bit parallel transmission, outputs of seventh bit, fifth bit, third bit, and first bit are allocated to a first signal line of the data signal line and outputs of sixth bit, fourth bit, second bit, and zeroth bit are allocated to a second signal line, of the data signal line, in an output order.

10. The signal processing device according to claim 8, wherein
in a case where the data transmitted for the eight-bit bit sequence, from the synchronous byte, is transmitted by two-bit parallel transmission, outputs of first bit, third bit, fifth bit, and seventh bit are allocated to a first signal line of the data signal line and outputs of zeroth bit, second bit, fourth bit, and sixth bit are allocated to a second signal line of the data signal line, in an output order.

11. The signal processing device according to claim 8, wherein
in a case where the data transmitted for the eight-bit bit sequence, from the synchronous byte, is transmitted by two-bit parallel transmission, outputs of third bit, second bit, first bit, and zeroth bit are allocated to a first signal line of the data signal line and outputs of seventh bit, sixth bit, fifth bit, and fourth bit are allocated to a second signal line of the data signal line, in an output order.

12. The signal processing device according to claim 8, wherein
in a case where the data transmitted for the eight-bit bit sequence, from the synchronous byte, is transmitted by two-bit parallel transmission, outputs of zeroth bit, first bit, second bit, and third bit are allocated to a first signal line of the data signal line and outputs of fourth bit, fifth bit, sixth bit, and seventh bit are allocated to a second signal line of the data signal line, in an output order.

13. The signal processing device according to claim 1, wherein
the sync signal line, the valid signal line, the clock signal line, and the data signal line use Low voltage differential signaling (LVDS) for an output interface.

14. The signal processing device according to claim 9, wherein
in a case where the two-bit parallel transmission is performed, two data outputs of eight data outputs are allocated as output terminals.

15. The signal processing device according to claim 14, wherein
the demodulation processing unit comprises a synthesis unit, and wherein in a system that receives a plurality of carrier waves, a plurality of data outputs, other than the two data outputs used for the two-bit parallel transmission is allocated to an input of the synthesis unit, that synthesizes the plurality of carrier waves, after being demodulated.

16. The signal processing device according to claim 14, wherein
the demodulation processing unit comprises a synthesis unit, and wherein in a system that receives a plurality of carrier waves, six data outputs, other than the two data outputs used for the two-bit parallel transmission, of the eight data outputs are allocated to an input of the synthesis unit that synthesizes the plurality of carrier waves, after being demodulated.

17. The signal processing device according to claim 1, wherein
the demodulation processing unit comprises a synthesis unit, and wherein in a system that receives a plurality of carrier waves, six data outputs, other than data outputs used for one-bit serial transmission, of eight data outputs are allocated to an input of the synthesis unit that synthesizes the plurality of carrier waves, after being demodulated.

18. A signal processing method comprising:
executing, by a demodulation processing unit, demodulation processing;
executing, by a demultiplexing processing unit, demultiplexing processing; and
transmitting, by the demodulation processing unit to the demultiplexing processing unit, a fixed length packet and a variable length packet, via a sync signal line, a valid signal line, a clock signal line, and a data signal line disposed between the demodulation processing unit and the demultiplexing processing unit, based on a synchronous byte allocated in a header of the fixed length packet and the variable length packet,
wherein the variable length packet includes a Type Length Value (TLV) packet and the fixed length packet includes a Transport Stream (TS) packet of fixed length or a packet obtained by conversion of the variable length packet into a fixed length TS packet.

19. The signal processing device according to claim 1, wherein
the synchronous byte is allocated in a head of the header, and wherein the synchronous byte is configured to constantly synchronize the fixed length packet and the variable length packet transmitted between the demodulation processing unit and demultiplexer processing unit.

* * * * *